US008002165B2

(12) United States Patent
Zurbuchen et al.

(10) Patent No.: US 8,002,165 B2
(45) Date of Patent: Aug. 23, 2011

(54) METHOD AND WELDING DEVICE FOR CONNECTING SHEETS OF MATERIAL

(75) Inventors: Reto Zurbuchen, Lucerne (CH); Ulrich Gubler, Rotkreuz/ZG (CH)

(73) Assignee: LEISTER Process Technologies, Kägiswil (CH)

( * ) Notice: Subject to any disclaimer, the term of this patent is extended or adjusted under 35 U.S.C. 154(b) by 0 days.

(21) Appl. No.: 12/741,394

(22) PCT Filed: Sep. 11, 2008

(86) PCT No.: PCT/EP2008/007440

§ 371 (c)(1), (2), (4) Date: May 5, 2010

(87) PCT Pub. No.: WO2009/065455

PCT Pub. Date: May 28, 2009

(65) Prior Publication Data

US 2010/0268372 A1 Oct. 21, 2010

(30) Foreign Application Priority Data

Nov. 20, 2007 (EP) .................................... 07022479

(51) Int. Cl.
*B23K 31/12* (2006.01)
*B23Q 15/00* (2006.01)
*B23Q 16/00* (2006.01)

(52) U.S. Cl. ................ 228/102; 228/8; 228/9; 228/103; 228/105

(58) Field of Classification Search ........................ None
See application file for complete search history.

(56) References Cited

U.S. PATENT DOCUMENTS 3,080,910 A 3/1963 Whitney, Jr.
3,596,048 A * 7/1971 Maeda et al. ............ 219/124.31

(Continued)

FOREIGN PATENT DOCUMENTS

EP 0 300 209 A2 1/1989

(Continued)

OTHER PUBLICATIONS

International Search Report for corresponding International Application No. PCT/EP2008/007440 mailed Jan. 16, 2009.

*Primary Examiner* — Kiley Stoner
(74) *Attorney, Agent, or Firm* — Renner, Otto, Boisselle & Sklar, LLP

(57) ABSTRACT

The invention relates to a method for connecting material webs disposed with overlapping edges, wherein an automatic welding machine having a driven chassis and a drive unit disposed thereon and a welding unit is guided along the overlap zone of the material webs to be connected, such that the carried welding unit connects the edges to be connected to one another. The invention further relates to an automatic welding machine for performing the method. The invention proposes that a temporary guide marking moving along with the chassis be generated along the edge of the overlapping material web by means of a marking unit disposed on the chassis, said guide marking always extending parallel to the edge and prescribing the path of the automatic welding machine on the overlapping material web and that the guide marking be detected by means of a sensor device during the movement of the automatic welding machine, wherein a control signal is generated for a display unit and/or the drive unit and the chassis is movable along the guide marking by means of the control signal.

10 Claims, 1 Drawing Sheet

U.S. PATENT DOCUMENTS 3,757,125 A * 9/1973 Okada et al. .................. 250/202
3,855,446 A * 12/1974 Kotova et al. ............ 219/124.34
3,861,574 A * 1/1975 Hoffmann et al. ................ 228/9
4,166,941 A * 9/1979 Cecil ........................ 219/124.34
4,215,299 A * 7/1980 Edwin et al. .................. 318/574
4,392,604 A * 7/1983 Sears ............................ 228/212
4,404,455 A * 9/1983 Gotoh ...................... 219/124.34
4,557,191 A * 12/1985 Speicher ........................... 101/4
4,577,796 A * 3/1986 Powers et al. ................. 228/102
4,636,612 A * 1/1987 Cullen ..................... 219/124.34
4,640,453 A * 2/1987 Oe et al. ....................... 228/17.7
4,675,502 A * 6/1987 Haefner et al. .......... 219/124.34
4,831,232 A * 5/1989 Andersson et al. ...... 219/124.34
5,189,514 A * 2/1993 Roden ........................... 348/169
5,439,157 A * 8/1995 Geier et al. ....................... 228/9
6,040,550 A * 3/2000 Chang ...................... 219/121.63
6,046,431 A * 4/2000 Beattie ..................... 219/124.34
6,204,469 B1 * 3/2001 Fields et al. ............... 219/121.6
6,909,799 B1 * 6/2005 Wildmann et al. ........... 382/152
2001/0013532 A1 * 8/2001 Higashi et al. .................... 228/9
2001/0054637 A1 * 12/2001 Hayakawa .................... 228/102
2003/0057258 A1 * 3/2003 Ishida et al. .................. 228/104
2004/0011472 A1 1/2004 Zurmuhle et al.
2004/0026390 A1 * 2/2004 Kondo ..................... 219/124.34
2005/0103766 A1 * 5/2005 Iizuka et al. ............. 219/124.34
2007/0271870 A1 * 11/2007 Mifsud et al. ................ 52/745.2

FOREIGN PATENT DOCUMENTS

EP 1 371 474 A1 12/2003
GB 2318885 A * 5/1998
JP 357115978 A * 7/1982
JP 402037978 A * 2/1990
WO 2005/009665 A1 2/2005

* cited by examiner

METHOD AND WELDING DEVICE FOR CONNECTING SHEETS OF MATERIAL

TECHNICAL FIELD OF INVENTION

The present invention relates to a method of connecting material webs arranged with overlapping edges, in which an automatic welding machine is guided with an undercarriage, drive unit and welding device along the overlapping zone of the material webs to be connected and in the process the edges to be connected are connected to one another by the welding device, as well as a correspondingly adapted automatic welding machine.

DISCUSSION OF RELATED ART

Such automatic welding machines and welding methods achievable with these are generally known. They are, for example, used to weld webs of plastic-coated woven fabric, plastic films and sealing webs made of plastic. Usable automatic welding machines normally have an undercarriage with a welding device and with pressure devices for the edges of the material webs to be welded. Known hot-air or hot-wedge welding devices which are suitable for this purpose or combinations of such welding devices can be used as the welding device.

Sealing webs, for example, for sealing off flat roofs are rolled out substantially parallel to one another when being laid on the roof. Therein, the webs are normally laid such that in each case the edge of the first material web laid is engaged across by the edge of the subsequently laid material web. The edges which adjoin one another on the flat side determine an overlapping zone in which the material webs are to be connected to one another in a watertight manner. To this end, a driven automatic welding machine is generally moved along the overlapping zone, which automatic welding machine moves with a constant speed defined by a drive unit of the automatic welding machine along the overlapping zone.

SUMMARY OF THE INVENTION

Therein, the problem arises that, despite the precise alignment of the automatic welding machine relative to the overlapping zone, at the start of the welding procedure, the track of the automatic welding machine does not always run parallel to the edge of the overlapping material web. Therein, there is the risk that the weld seam can have a changing weld seam width across its entire length depending on the precision when laying the material webs. This reduces the quality of the weld seam so that the roof seal can become permeable to water over time. For an optimum weld seam, this leads to the alignment of the automatic welding machine having to be corrected time after time with respect to the edge of the upper material web. This is generally carried out by an operator who manually steers the automatic welding machine. Therein, it is disadvantageous that, to this end, the operator must permanently monitor the automatic welding machine.

The object of the invention is to propose a welding method and an automatic welding machine which facilitates the production of the weld seam connection between the material webs and simultaneously ensures an improvement in the weld seam quality.

This object is achieved according to the invention by a welding method with the features of Claim 1 and by an automatic welding machine with the features of accompanying Claim 6. Further advantageous configurations are apparent from the subordinate claims which refer back in each case.

According to the invention, in the case of the proposed method, a temporary guidance marking for the automatic welding machine, which marking extends at all times parallel, i.e. directly adjoining or at all times at the same distance from the edge of the overlapping edge and moves along at the same time, is generated on the overlapped material web by means of a marking device arranged on the automatic welding machine along the edge of the overlapping material web. The movement path of the automatic welding machine is defined by means of the guidance marking, in which automatic welding machine the guidance marking is detected with a sensor device during the movement of the automatic welding machine. To this end, the guidance marking is preferably generated and scanned in the welding direction upstream of the automatic welding machine. Therein, a control signal is formed for a display unit and/or for a steering unit of the undercarriage which changes if the automatic welding machine deviates from the movement path defined by the guidance marking. By means of the control signal, the undercarriage is movably steered automatically or manually by means of a suitable steering unit always precisely along the movement path defined by the generated guidance marking so that the weld seam width remains unchanged over the entire weld seam length. In particular, therein, the movement path of the automatic welding machine and thus the weld seam always run parallel to the edge of the overlapping material web.

Therein, the guidance marking has a shorter length than the material webs and preferably than the undercarriage. It moves with the automatic welding machine and, after the welding procedure, does not remain as a guidance line on the lower material web. Since the operator no longer needs to check the alignment of the automatic welding machine himself and align it manually, but rather this happens automatically, the user friendliness and the potential welding speed are increased over conventional automatic welding machines and known welding methods. It is furthermore possible to further increase the maximum welding speed.

The overlapping zone is preferably illuminated from the direction of the overlapping material web with a light source as a marking device and thus a cast shadow proceeding from the edge of the overlapping material web is generated on the overlapped material web, which shadow serves as a guidance marking. The cast shadow directly adjoins the edge of the upper border of the overlapping material web on the overlapped material web. Any type of illuminant which emits bright light can in principle be used as a light source. White light emitting diodes or laser diodes are preferably used.

An opto-electronic sensor is correspondingly preferably used as a sensor device which is adapted to the type of illuminant. The illuminance of the light source and the integration time of the sensor can be adapted to the material webs currently to be connected before and during the welding process in order to obtain an optimum contrast. In order, in the case of a white-emitting light source, to achieve the optimum contrast of the guidance marking in comparison to the material webs for scanning by the sensor, spectral filters matched to the colour of the material webs can be exchangeably fitted upstream of the opto-electronic sensor. In order to increase illuminance, the light source can also be pulsed. Therein, the overlapping zone can be detected permanently or only at the time intervals in which the guidance marking is generated. It is particularly advantageous and expedient if the light source and the sensor are synchronously clocked.

Automatic welding machines of the type described above are used in very different surroundings and in different light conditions. Therein, it must be ensured that stray light does not make difficult or prevent the detection of the guidance marking and thus the edge of the overlapping material web. The sun or floodlights can in certain circumstances in the event of applications on the roof cause disturbing reflections on shiny material webs or stray light from lamps or neon tubes can impair detection in the case of applications in buildings. In the case of the method according to the invention, the overlapping zone is ideally protected in the marking region of the marking device from stray light from the surroundings by means of a shading device provided on the undercarriage. The guidance marking thus can be distinguished easily from the overlapped material web and from the edge of the overlapping material web. The guidance marking can thus be detected without any problems with the sensor device.

According to the invention, the proposed automatic welding machine has a marking device, arranged, for example, on the undercarriage, by means of which marking device a temporary guidance marking, which moves with the undercarriage, extends at all times parallel to the edge and defines the movement path of the automatic welding machine, can be generated on the overlapped material web along the edge of the overlapping material web, and a sensor device, also arranged, for example, on the undercarriage, with which the guidance marking can be detected during the movement of the automatic welding machine, so that a control signal for a display unit and/or a steering unit can be formed with which the automatic welding machine is always precisely moveable along the movement path defined by the guidance marking.

A chain of light emitting diodes can be used, for example, as a display unit which visualises the control signal and in particular optically represents the deviation of the current movement path from the edge of the overlapping material web in terms of direction and size. The operator of the automatic welding machine is always precisely informed by means of the display unit of the alignment of the undercarriage relative to the overlapping zone and can thus intervene where necessary as a function of the deviation. This makes it easier for the operator to perform manual alignment of the undercarriage during guidance of the automatic welding machine manually along the overlapping zone. In addition, as well as the optical display, an acoustic signal can be helpful.

By means of the control signal, the proposed automatic welding machine need no longer as in the case of previous automatic welding machines necessarily be guided manually using the material webs which lie on top of one another in the overlapping zone in order to produce a weld seam with a specific width along the edge of the overlapping material web. This creates the possibility of a fully automatically operating welding robot which can substantially independently connect material webs by means of the welding device carried along by the undercarriage thermally, for example, by hot-gas welding or hot-wedge welding, or chemically with a solvent welding means. The drive unit can have an electric, combustion or any other suitable engine to which a separate energy supply unit, for example, a battery, an accumulator or a tank for a gaseous or liquid fuel can be assigned. It goes without saying that the energy supply of the automatic welding machine can also be carried out via a power cable which can be carried along by the undercarriage. The automatic welding machine can be formed as a tracked or wheeled vehicle. It preferably has a driven undercarriage with running wheels which are at least partially connected to the drive unit and can be steered at least partially by means of a steering unit.

In one preferred embodiment of the invention, the marking device has a light source for local illumination of the overlapping zone of the material webs. Therein, the marking device is arranged together with the sensor device preferably at the front on the undercarriage as seen in the welding direction. The light source is ideally fastened on the undercarriage such that it obliquely illuminates the overlapping zone from the direction of the overlapping material web. The light source thus advantageously generates a cast shadow which proceeds from the edge of the overlapping material web on the overlapped material web which serves as a guidance marking. The cast shadow directly adjoins the upper edge of the overlapping material web.

It has been shown that, for example, white light emitting diodes are particularly suitable as a light source as a result of their wide spectral emission or laser diodes as a result of their strong directed light emission. The light efficiency and the service life of such diodes can be further improved by operating these in a pulsed manner. Of course, any other suitable illuminant with adequate brightness can also be used as a light source.

In order to detect the guidance marking, in the case of the automatic welding machine according to the invention, an opto-electronic sensor is used in one embodiment with which the guidance marking is detected in the overlapping zone. Therein, the cast shadow boundary to the edge of the illuminated overlapping material web is preferably detected and used to form the control signal for the drive unit.

To this end, an optical sensor which extends one-dimensionally or two-dimensionally can be positioned perpendicularly or at an angle to the overlapping zone. The sensor can be embodied as a one-dimensional line scan camera or as a two-dimensional sensor array, for example, with a CCD or CMOS chip. The control signal for correction of the movement path can be derived continuously or at defined time intervals with a computer unit with a microprocessor from the angle and the direction in which an imaginary central longitudinal axis of the automatic welding machine diverges from the edge of the overlapping border of the guidance marking detected as the transition from the shaded part of the overlapped to the illuminated part of the overlapping material web and thus from the desired movement path. A correction factor is determined from the tendential and the absolute deviation and passed on to an actuator which automatically independently corrects the alignment of the automatic welding machine to the edge of the overlapping material web. The sensor device and the marking device are preferably therefore arranged at a different lateral distance to the guidance marking and thus to the edge of the overlapping material web, wherein the sensor device scans the guidance marking for precise location preferably perpendicularly from above. The edge of the upper material web can thus be detected without any problems, with great precision and reliably.

For automatic correction of the movement path, the drive unit preferably has a steering unit which can be influenced with the control signal of the sensor device. Therein, steering of the automatic welding machine is carried out, for example, by accelerating or braking a front or rear running wheel of the undercarriage or by pivoting a steerable guide or drive wheel attached at the front or rear on the undercarriage.

Bright stray light which strikes the overlapping zone obliquely can disrupt the functioning of the marking device and/or the sensor device especially in the case of bright or shiny material webs. Therein, the difference in brightness between the guidance marking and the material webs is less and is thus more difficult for the sensor device to detect. Moreover, stray light can be reflected directly onto the scanning window of the sensor device, as a result of which the scanning of the guidance marking is made more difficult or entirely prevented.

For reliable detection of the guidance marking, the automatic welding machine has a shading device, preferably a protective hood against stray light which is arranged on the undercarriage engaging around or over the marking and the sensor device jointly. The protective hood shades the marking region around the overlapping zone and additionally protects this from stray light. Detection of the edge of the overlapping material web can thus be carried out reliably independently of the colouring of the material webs in the case of an illumination of the overlapping zone with a white-emitting light source. To this end, the protective hood advantageously has a lateral wall which extends towards the material webs and prevents direct reflections of a remote light source onto the light-sensitive sensor.

The invention is explained in greater detail below with reference to an exemplary embodiment. Further features of the invention will become apparent from the enclosed drawings and the description of the exemplary embodiment in combination with the claims. The individual features of the invention can be achieved for themselves alone or multiply in the case of different embodiments of the invention. In a schematic representation:

DETAILED DESCRIPTION OF THE INVENTION

Figure 1:
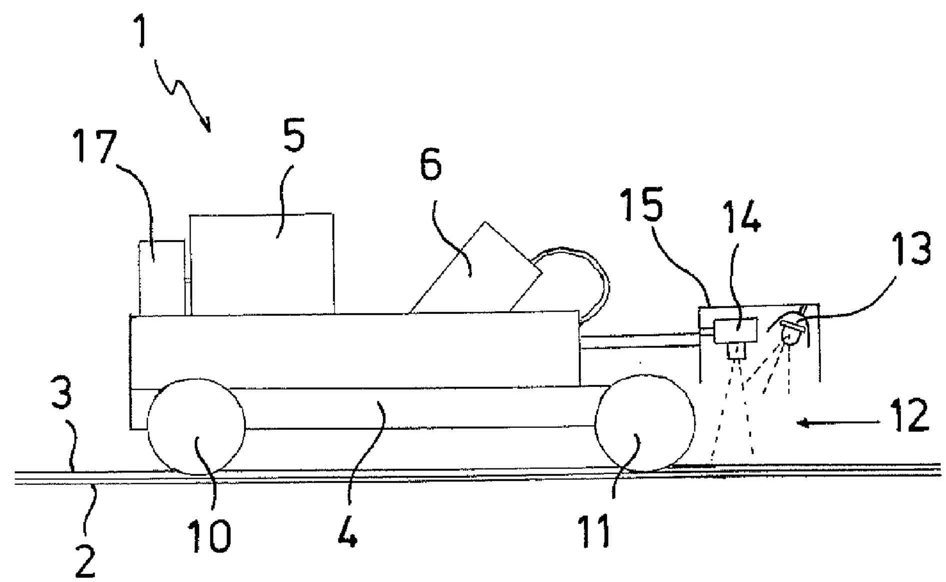
FIG. 1 shows an automatic welding machine according to the invention in a side view.

FIG. 1 shows an automatic welding machine 1 according to the invention for connecting laterally overlapping material webs 2, 3, which are arranged next to one another, the machine having a driven undercarriage 4 and drive unit 5 arranged thereon and welding device 6. In addition, a steering unit, which is not shown and integrated or connected or separate in the drive unit, is provided for steering of automatic welding machine 1. Using welding device 6, material webs 2, 3, as is apparent from FIG. 2, can be welded to one another on overlapping borders 7, 8 in an overlapping zone 9. Drive unit 5 has, as seen in the welding direction, front supporting wheels 11 and rear drive wheels 10, wherein steering of automatic welding machine 1 is carried out via supporting wheels 10. Using drive unit 5, automatic welding machine 1 can be moved along overlapping zone 9 with a uniform speed for connecting material webs 2, 3.

Marking devices 13 in the form of a light source and sensor device 14 in the form of a single-line line scan camera are arranged with a vertical spacing to material webs 2, 3 at front end 12 of undercarriage 4 on which supporting wheels 11 are also provided. Light source 13 and line scan camera 14 are jointly engaged across by a protective hood 15 as a shading device which extends in the vertical direction towards overlapping zone 9. Protective hood 15 protects line scan camera 14 and material webs 2, 3 below covering hood 15 from disturbing stray light.

Figure 2:
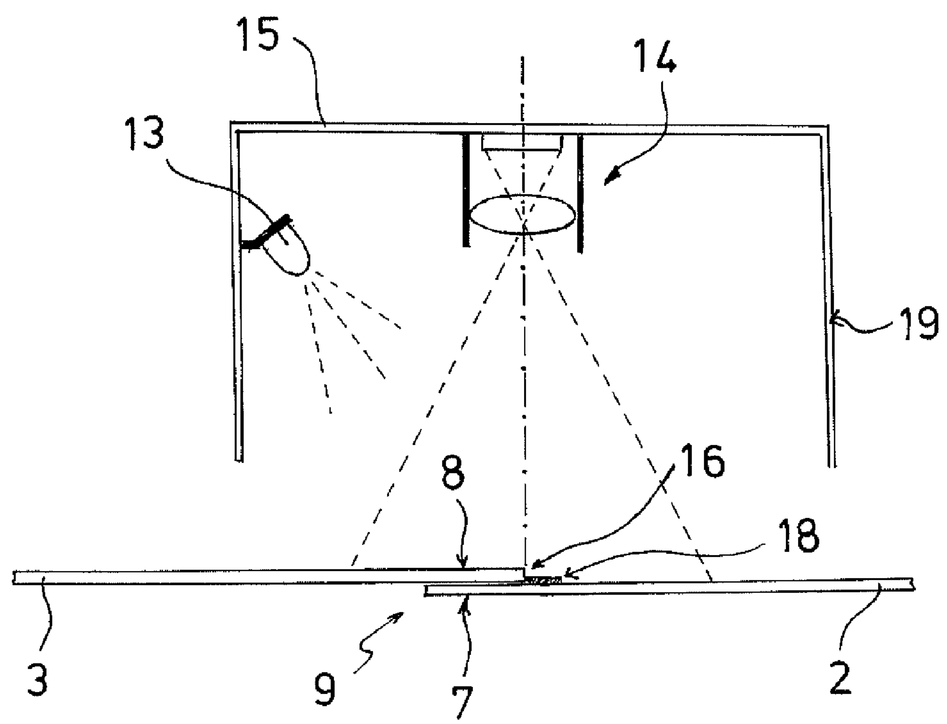
FIG. 2 shows the marking and sensor device of the automatic welding machine from FIG. 1 during the generation of the temporary guidance marking on the overlapping zone.

FIG. 2 shows marking device 13 and sensor device 14 as seen in the welding direction. Undercarriage 4 of automatic welding machine 1 is not shown in FIG. 2. Material webs 2, 3 to be connected are laid relative to one another with overlapping borders 7, 8. Upper material web 3 engages with border 8 thereof over border 7 of lower material web 2. In the further description, lower material web 2 is referred to as an overlapped material web and upper material web 3 as an overlapping material web.

Borders 7, 8 of material webs 2, 3 determine overlapping zone 9 in which overlapping material web 3 is to be welded to overlapped material web 2 with a uniform weld seam width. Since overlapping zone 9 only has a specific width, automatic welding machine 1 must be guided as precisely as possible parallel to edge 16 at border 8 of overlapping material web 3. To this end, as is apparent from FIG. 1, automatic welding machine 1 has a central control unit 17 which laterally rotates at least one of supporting wheels 11 in order to enable alignment of undercarriage 4 and thus adapt the movement path of automatic welding machine 1 to the profile of edge 16. Alternatively, both supporting wheels 11 can also be driven with separate engines which enable alignment of undercarriage 4 as a result of a different speed. Central control unit 17 is supplied by sensor device 14 with a control signal which shows the deviation of the movement path of automatic welding machine 1 from edge 16 of overlapping material web 3.

It is usually difficult to scan edge 16 of overlapping border 8 in the case of diffuse illumination using line scan camera 14 since there is inadequate contrast between material webs 2, 3. The contrast which is required for reliable detection of edge 16 is produced with a guidance marking 18. If bright light from light source 13 falls from the direction of overlapping material web 3 at a specific angle onto overlapping zone 9, a cast shadow 18 proceeding from edge 16 is created, which shadow extends in the direction of overlapped material web 2 along overlapped border 7. The bright/dark boundary between cast shadow 18 and illuminated upper border 8 of overlapping material web 3 is reliably detected by line scan camera 14.

For optimum detection of guidance marking 18, line scan camera 14 scans overlapping zone 9 perpendicularly from above, wherein light source 13 is arranged laterally of line scan camera 14 and illuminates overlapping zone 9 obliquely from above. A cast shadow 18 which is as broad and sharp as possible can thus be generated as a guidance marking along edge 16 of the overlapping material web. Guidance marking 18 is, as a light marking, temporary and moves with automatic welding machine 1 together along overlapping zone 9 since light source 13 is attached to undercarriage 4. Protective hood 15 which protects overlapping zone 9 from stray light at least around guidance marking 18 is formed so as to be pot-shaped. It engages across light source 13 and line scan camera 14 jointly. Therein, side wall 19 of protective hood 15 extends a little up to material webs 2, 3 and prevents reflections proceeding from stray light in the shaded protection region in overlapping zone 9.

The invention claimed is:

1. A method for connecting material webs arranged with overlapping edges, in which an automatic welder which has a carriage, a drive unit and a welding device, is guided along an overlapping zone of the material webs to be connected, whereby the edges to be connected are connected to each other by the welding device, wherein a temporary guide marking moving with the carriage along the edge of the overlapping material web and prescribing a movement track of the automatic welder is generated on the overlapped material web by means of a marking device arranged on the automatic welder, and the guide marking is detected during the movement of the automatic welder by a sensor device whereupon a control signal is produced for a display unit and/or for a steering unit and the automatic welder is always movable precisely along the movement track prescribed by the generated guide marking by means of the control signal.

2. A method according to claim 1, wherein the overlapping zone is illuminated from the direction of the overlapping material web with a light source as marking device and a hard shadow starting from the edge of the overlapping material web is generated on the overlapped material web, which serves as guide marking.

3. A method according to claim 1, wherein an opto-electronic sensor is used as sensor device.

4. A method according to claim 2, wherein the light source and the sensor are synchronously clocked.

5. A method according to claim 1 wherein the overlapping zone is protected in the marking area of the marking device from stray light from the environment by means of a shutter device provided on the carriage.

6. An automatic welder for connecting material webs arranged with overlapping edges, having a carriage, a drive unit and a welding device, the carriage being guidable along an overlapping zone of the material webs to be connected and the edges to be connected being connectable by means of the welding device, wherein by a marking device by means of which a temporary guide marking, moving together with the carriage and prescribing a movement track of the automatic welder can be generated on the overlapped material web along the edge of the overlapping material web, and a sensor device with which the guide marking can be detected during the movement of the automatic welder, so that a control signal for a display unit and/or for a steering unit can be produced, with which the automatic welder is always movable precisely along the movement track prescribed by the guide marking, wherein the marking device and the sensor device have a different lateral distance from the guide marking, the sensor device comprises an opto-electronic sensor which retrieves the guide marking vertically from above, the marking device has a light source which locally illuminates the overlapping zone of the material webs from the direction of the overlapping material web at an angle, the light source produces a hard shadow along the edge serving as the guide marking, the drive unit has a steering unit which can be influenced by the control signal from the sensor device, and the automatic welder has a shutter device, which is arranged on the carriage jointly surrounding or overlapping the marking device and the sensor device.

7. An automatic welder for connecting material webs arranged with overlapping edges, having a carriage, a drive unit and a welding device, the carriage being guidable along an overlapping zone of the material webs to be connected and the edges to be connected being connectable by means of the welding device, wherein by a marking device by means of which a temporary guide marking, moving together with the carriage and prescribing a movement track of the automatic welder can be generated on the overlapped material web along the edge of the overlapping material web, and a sensor device with which the guide marking can be detected during the movement of the automatic welder, so that a control signal for a display unit and/or for a steering unit can be produced, with which the automatic welder is always movable precisely along the movement track prescribed by the guide marking, wherein the automatic welder has a shutter device, which is arranged on the carriage jointly surrounding or overlapping the marking device and the sensor device, while the shutter device has a lateral wall which extends to the material webs.

8. An automatic welder according to claim 7, wherein the shutter device is a protective hood against stray light.

9. An automatic welder according to claim 6, wherein the shutter device has a lateral wall which extends to the material webs.

10. An automatic welder according to claim 6, wherein the shutter device is a protective hood against stray light.

* * * * *